(12) United States Patent
Boryca et al.

(10) Patent No.: US 7,975,604 B2
(45) Date of Patent: Jul. 12, 2011

(54) DOUGH PROOFING APPARATUS AND RELATED METHODS

(75) Inventors: Walter J. Boryca, Keller, TX (US); Jackson M. Miles, Jr., Weatherford, TX (US); Thomas Rands, Kansas City, MO (US)

(73) Assignee: Premark FEG L.L.C., Wilmington, DE (US)

( * ) Notice: Subject to any disclaimer, the term of this patent is extended or adjusted under 35 U.S.C. 154(b) by 953 days.

(21) Appl. No.: 10/846,065

(22) Filed: May 14, 2004

(65) Prior Publication Data

US 2004/0226457 A1 Nov. 18, 2004

Related U.S. Application Data

(60) Provisional application No. 60/471,170, filed on May 16, 2003.

(51) Int. Cl.
  *A47J 37/06* (2006.01)
  *A21B 1/26* (2006.01)
  *F27D 7/04* (2006.01)
(52) U.S. Cl. ............ 99/476; 99/474; 126/21 A; 219/400
(58) Field of Classification Search .................... 99/476, 99/474, 475, 478, 479, 477; 126/21 A; 219/400
  See application file for complete search history.

(56) References Cited

U.S. PATENT DOCUMENTS

| | | | |
|---|---|---|---|
| 3,861,378 A | 1/1975 | Rhoads et al. | |
| 4,162,141 A * | 7/1979 | West | 432/144 |
| 4,426,923 A | 1/1984 | Ohata | |
| 4,587,946 A | 5/1986 | Doyon et al. | |
| 4,771,163 A | 9/1988 | Thiboutot | |
| 4,823,766 A | 4/1989 | Violi | |
| 4,884,553 A | 12/1989 | Schwarzbacker | |
| 4,975,047 A | 12/1990 | Mitsuhashi et al. | |
| 5,228,385 A | 7/1993 | Friedrich et al. | |
| 5,401,940 A | 3/1995 | Smith et al. | |
| 5,463,940 A | 11/1995 | Cataldo | |
| 5,601,070 A | 2/1997 | Hotard et al. | |
| 5,789,007 A | 8/1998 | Bianco | |
| 5,801,362 A | 9/1998 | Pearlman et al. | |
| 5,913,967 A | 6/1999 | Eisele | |
| 5,928,541 A | 7/1999 | Tsukamoto et al. | |
| 5,958,274 A * | 9/1999 | Dobie et al. | 219/681 |
| 6,350,965 B2 | 2/2002 | Fukushima et al. | |
| 6,393,969 B1 * | 5/2002 | Kim | 99/331 |
| 6,564,699 B1 * | 5/2003 | Vincente et al. | 99/468 |
| 6,619,189 B1 | 9/2003 | Tippmann et al. | |
| 6,870,136 B1 * | 3/2005 | Majordy | 219/400 |

OTHER PUBLICATIONS

Hobart Food Equipment—HPC Series Brochure, 4 pages, Apr. 1, 2001.

\* cited by examiner

*Primary Examiner* — Reginald L Alexander
(74) *Attorney, Agent, or Firm* — Thompson Hine LLP

(57) ABSTRACT

A dough proofing cabinet includes a chamber having one or more air ducts with a plurality of air duct openings distributed both vertically and horizontally thereon, and an outlet opening in an upper part of the chamber. Operation of a blower causes air flow from the chamber, through the outlet opening, past the heating element to the air duct or ducts and out through the air duct openings. In one example, the chamber includes air ducts extending downward on opposite side of the chamber.

16 Claims, 10 Drawing Sheets

DOUGH PROOFING APPARATUS AND RELATED METHODS

CROSS REFERENCE TO RELATED APPLICATION

This application claims the benefit of provisional patent application Ser. No. 60/471,170, filed May 16, 2003, the entire specification of which is hereby incorporated by reference.

TECHNICAL FIELD

The present application relates generally to cabinets utilized for proofing dough (i.e., allowing the dough to rise), and more particularly to a dough proofing cabinet with an improved air flow system for more uniform proofing within the cabinet.

BACKGROUND

It is known to provide dough proofers in the form of cabinets having chambers for holding dough products. For example, FIGS. 8A-8B illustrate one embodiment of a known prior art dough proofer 200 having a chamber 202 with a door to provide access and permitting a rack of dough products to be rolled into and out of the chamber 202. A rectangular heating unit 203 includes an internal heating plate 204 and associated source of water behind a wall or panel 206 of the unit 203. Toward the top of the panel 206 one or more axial fans 208 are provided in association with openings 210 of the panel 206. The fans 208 are operated to cause humid air to flow in the general manner shown, downward across the heating plate 204, past an opening or openings 212 defined by the bottom part of the panel 206, upward through the chamber 202, and then back through the panel 206 toward the top thereof to again pass move down and pass over the heating plate 204.

Another prior art proofer construction 300, shown in FIGS. 9A and 9B, included an air flow through an opening in the top its chamber 302, past a heating element, and then back down past its blower 304 into ducts 306 and 308 leading down the sides of the proofer, with the ducts 306 and 308 being open only at the bottom to allow the air to exit back into the chamber 302.

It would be advantageous to provide a dough proofer with an improved air flow arrangement in order to provide a more uniform air flow over the dough products during proofing, resulting in more uniform proofing.

SUMMARY

In one aspect, a dough proofing apparatus includes a chamber for holding dough during proofing operations and having a door for accessing the chamber. At least one air duct extends on a first side of the chamber and has a plurality of openings distributed both vertically and horizontally in the chamber, and at least one air duct extends on a second side of the chamber and has a plurality of openings distributed both vertically and horizontally in the chamber, the second side opposite the first side. An air outlet opening is also provided and a first air flow path leads from the outlet opening to the air duct on the first side of chamber, and a second air flow path leading from the outlet opening to the air duct on the second side of the chamber. At least one blower is located for causing air to flow from the chamber, through the outlet opening, and both (i) along the first air flow path to the air duct on the first side of the chamber and out through the air duct openings thereof and (ii) along the second air flow path to the air duct on the second side of the chamber and through the air duct openings thereof. At least one heating element is located to heat air moved by the blower In another aspect, a dough proofing apparatus includes a chamber for holding dough during proofing operations, at least one air duct extending on one side of the chamber and having a plurality of openings distributed both vertically and horizontally in the chamber, and at least one outlet opening. An air flow path extends from the outlet opening to the air duct. At least one blower is located to cause air to flow from the chamber, through the outlet opening, along the air flow path to the air duct to create a pressurized condition in the air duct causing air to flow out through the air duct openings. A heating element is located along the air flow path to have air moved by the blower pass thereby for heating.

In yet another aspect, a method for proofing dough involves the steps of: providing a dough proofing apparatus having a chamber for holding dough, one or more air ducts with a plurality of openings therein, the air duct openings arranged so as to be distributed both vertically and horizontally in the chamber, an air outlet, a heating element located in flow communication with the air outlet, at least one air flow path from the heating element to the air duct; placing dough within the chamber; operating at least one blower to cause air flow from the chamber, through the outlet opening, over the heating element, along the air flow path into the air duct, and out through the air duct openings; and controlling a heat output by the heating element to produce a temperature condition within the chamber suitable for proofing dough.

DETAILED DESCRIPTION

Figure 1:
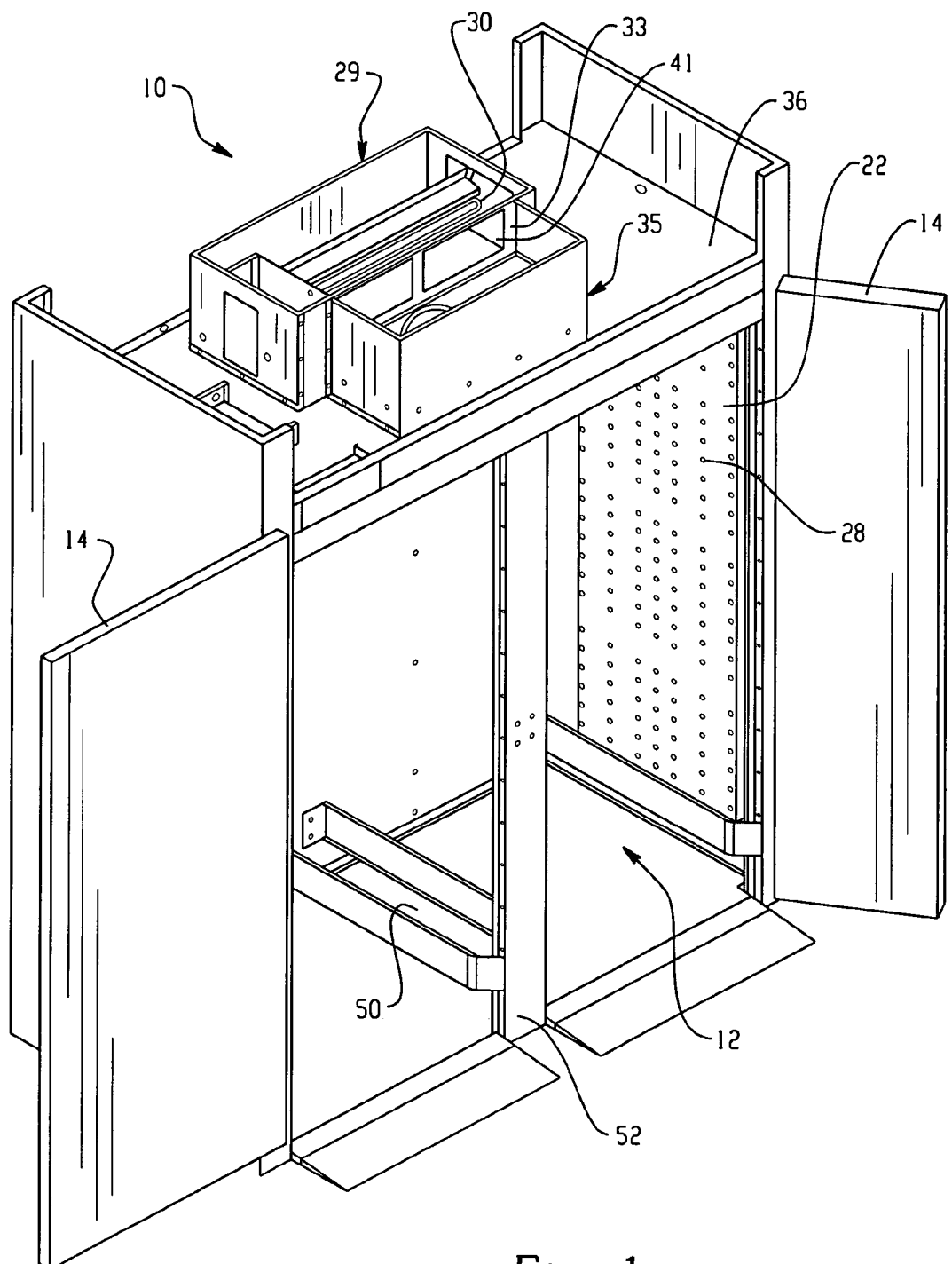
FIGS. 1-4 illustrate one embodiment of a dough proofer.
Figure 2:
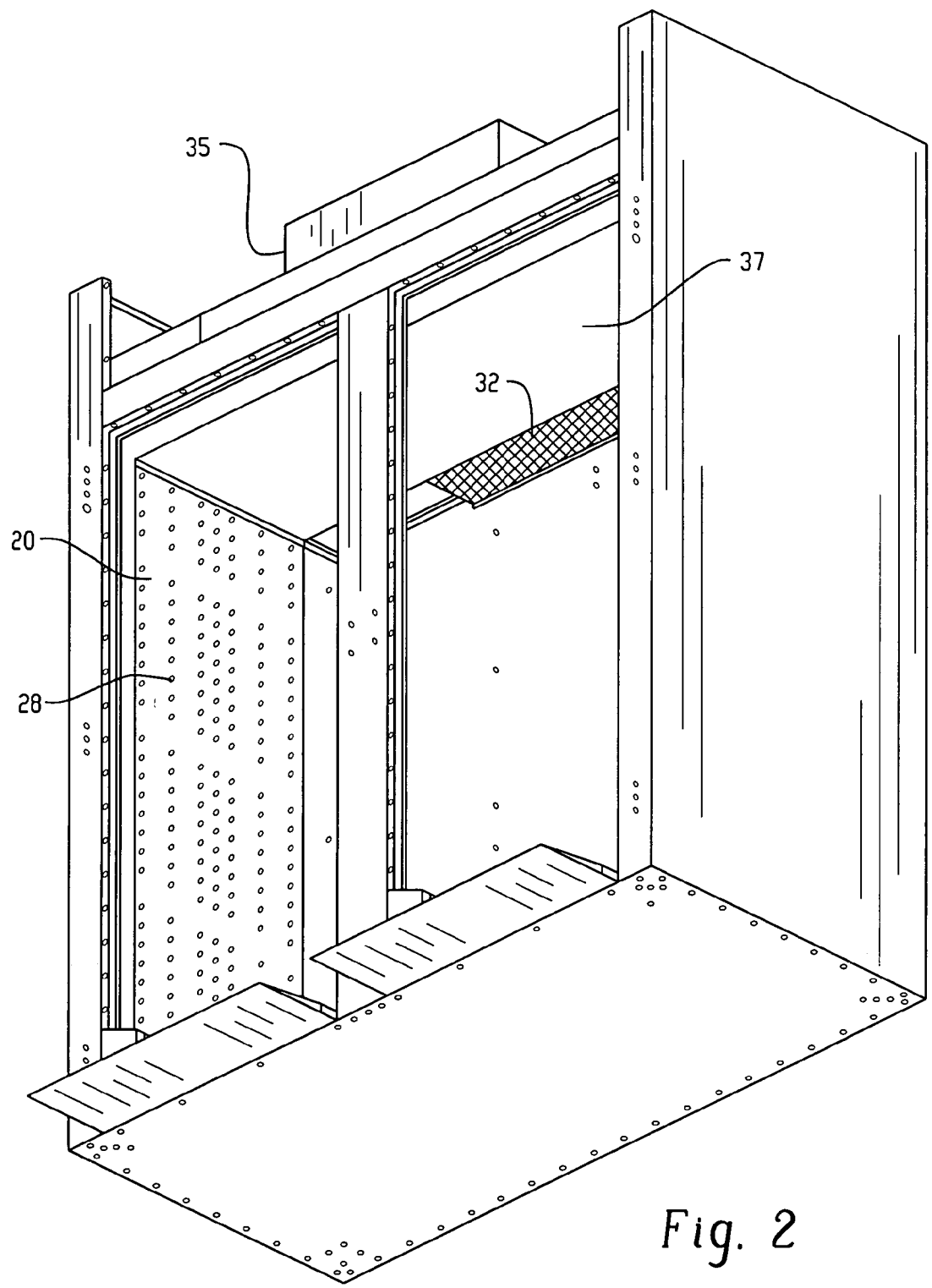
Figure 3:
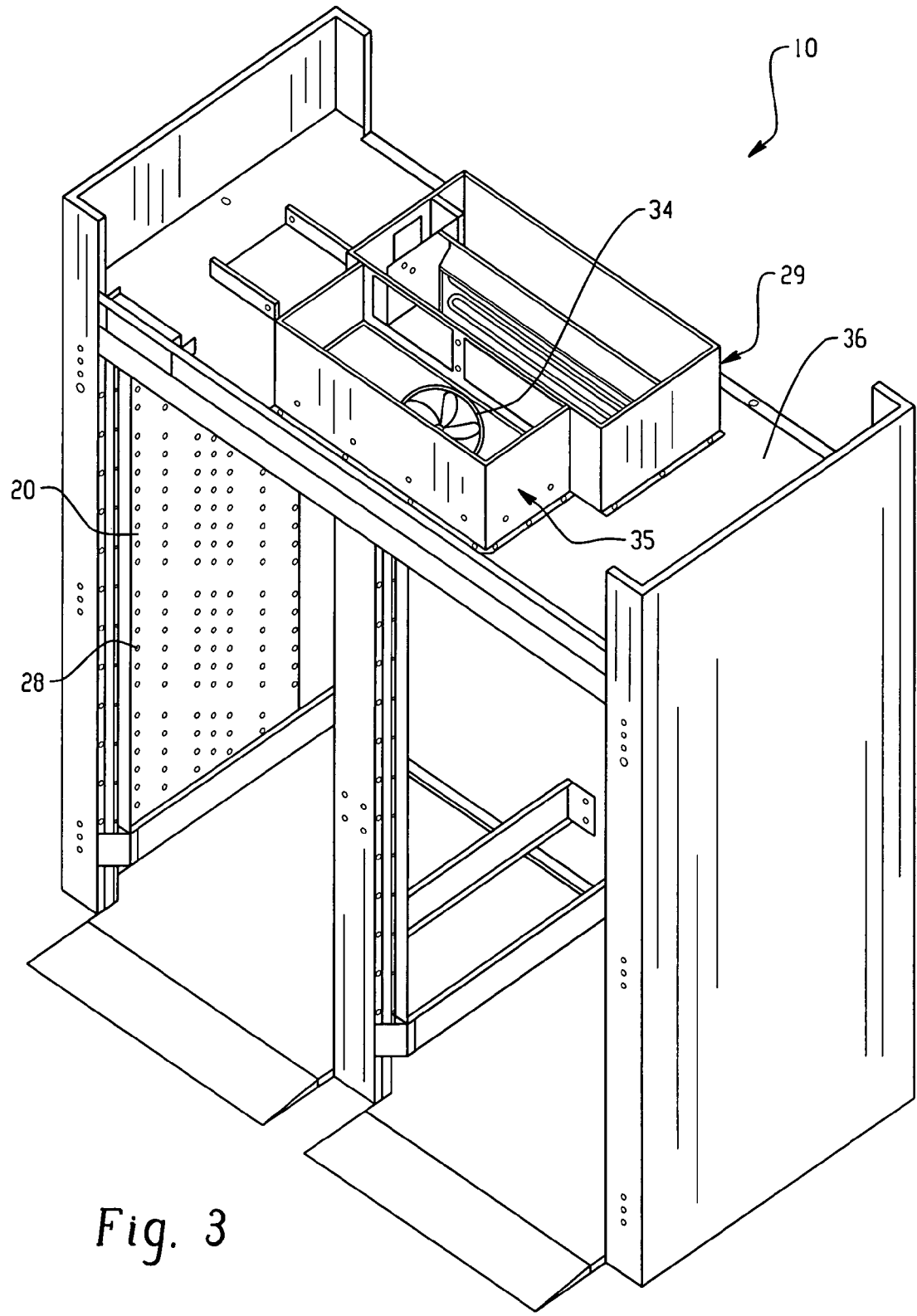
Figure 4:
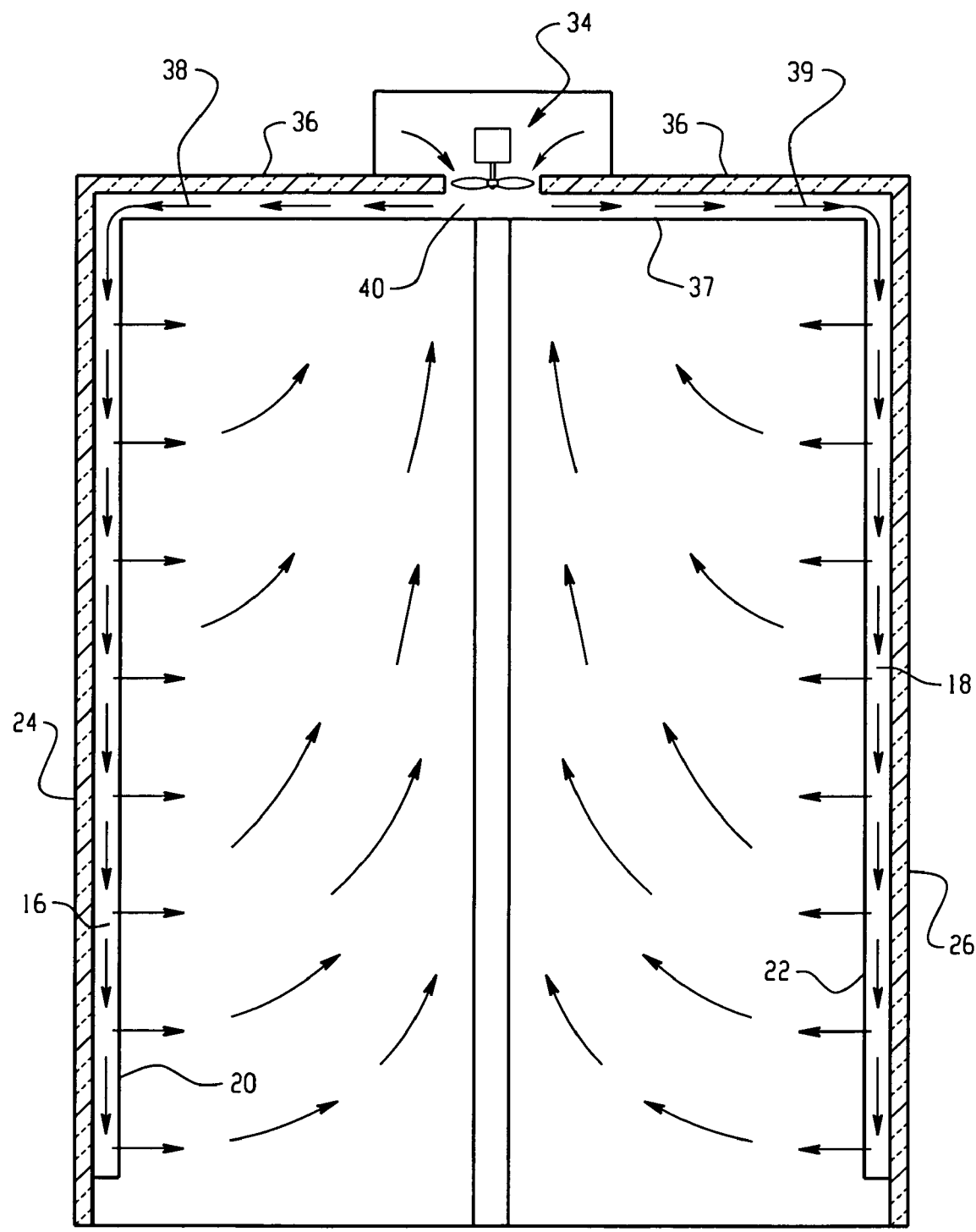

Referring to FIGS. 1-4 a proofer 10 includes a proofing chamber 12 and a door or doors 14 that provide access to the chamber 12 for permitting a rack of dough products to be moved into and out of the chamber 12. In the illustrated embodiment the chamber 12 includes two compartments with respective doors for receiving two separate racks. Air ducts 16 and 18 (FIG. 4) extend downward along respective sides of the chamber 12. In the illustrated embodiment the ducts 16 and 18 are each formed by one or more u-shaped panels 20 and 22 affixed to the insulated side walls 24 and 26 of the proofer box. Each air duct 16 and 18 includes a plurality of openings 28 distributed both vertically and horizontally in the chamber 12 for providing a relatively uniform distribution of air into the chamber as described in more detail below. Notably, the bottom of each duct 16 and 18 is closed, although small openings could be provided. While the illustrated embodiment provides a single air duct on each side of the chamber, multiple air ducts on each side of the chamber (such as multiple ducts side by side along the depth of the unit) could be utilized to provide the vertical and horizontal distribution of the air duct openings.

A heating element 30, which may take the form of a resistive-type heating rod, is located outside the chamber, particularly above the top of the chamber in a box structure 29. An upper part of the chamber includes at least one outlet opening 32 (in the illustrated embodiment covered by a screen) that communicates with the heating element 30. It is contemplated that opening 32 could be located elsewhere, such as in a rear wall or panel of the box. One or more blowers 34 are provided, and may take the form of axial fans located in a box structure 35 and aligned with a downward opening or openings in an upper insulated wall 36 that, together with an upper u-shaped panel 37, forms a top duct area 40. One air flow path 38 leads from the heating element 30, past the blower 34, and to the air duct 16, and another air flow path 39 leads from the heating element 30, past the blower 34 and to the air duct 18, the two air flow paths overlapping slightly. A common wall 33 of the two box structures 29 and 35 includes one or more openings 41 to provide air flow between the two, and the top of both box structures is covered (as by a plate or plates) in final construction. Chamber air outlet opening 32 leads into the bottom of box structure 29.

Operation of the blower 34 causes air flow (shown by the arrows in FIG. 4) from the chamber 12, through the outlet opening 32 into box 29, past the heating element 30, into box 35, and then back along the two air flow paths 38 and 39 into ducts 16 and 18 where it exits the ducts through the distributed openings 28 and then moves upward through the open part of the chamber 12 back toward the outlet opening 32. In one example, a combination of the sizing of the blower and the size and number of the air duct openings 28 provides for an increased pressure condition in the air ducts 16 and 18 when the blower is operated, increasing the uniformity of air flow into the chamber along the vertical height of the chamber.

In one example, the air duct openings 28 are vertically distributed over at least two thirds (⅔) of a height of the chamber 12. In another example, the air duct openings are vertically distributed over at least three fourths (¾) of a height of the chamber 12. In still another example, the air duct openings are vertically distributed over at least four fifths (⅘) of a height of the chamber 12. It is also contemplated that the air duct openings could be distributed along substantially the entire height of the chamber. Such vertical distribution of the air duct openings 28 aids in more uniform proofing throughout the vertical height of the chamber.

The heating element 30 is controllably energized during a proofing process to add heat to the flow of air and produce a temperature condition within the chamber 12 suitable for dough proofing. A suitable temperature condition for dough proofing is a temperature in the range of 65° F. to 115° F., with the typical proofing temperature range being between 90° F. to 100° F. A controller may be provided to control energization of the heating element and operation of the blower, and a temperature sensor may also be included to provide input to the controller. The temperature sensor may be located between the air outlet 32 and the heating element 30 to determine the temperature of the air upon exiting the chamber 12.

The proofer 10 could also be provided with a center mullion or one or more center air ducts (e.g. in a region 50 behind front center stud 52), with such center mullion or ducts including distributed openings. An additional blower or blowers could be provided as needed to pressurize such center duct(s).

Figure 5:
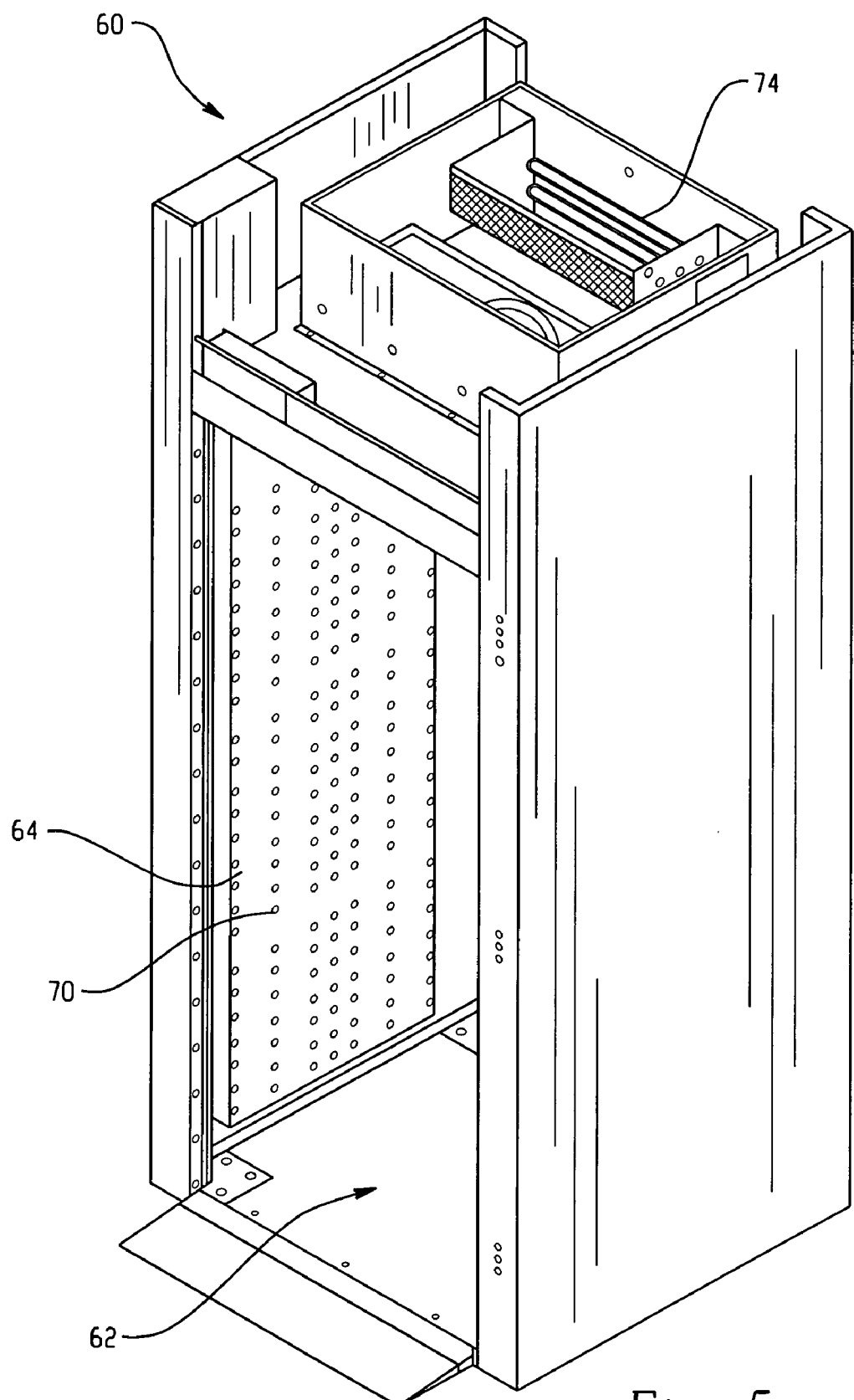
FIGS. 5-7 illustrate another embodiment of a dough proofer.
Figure 6:
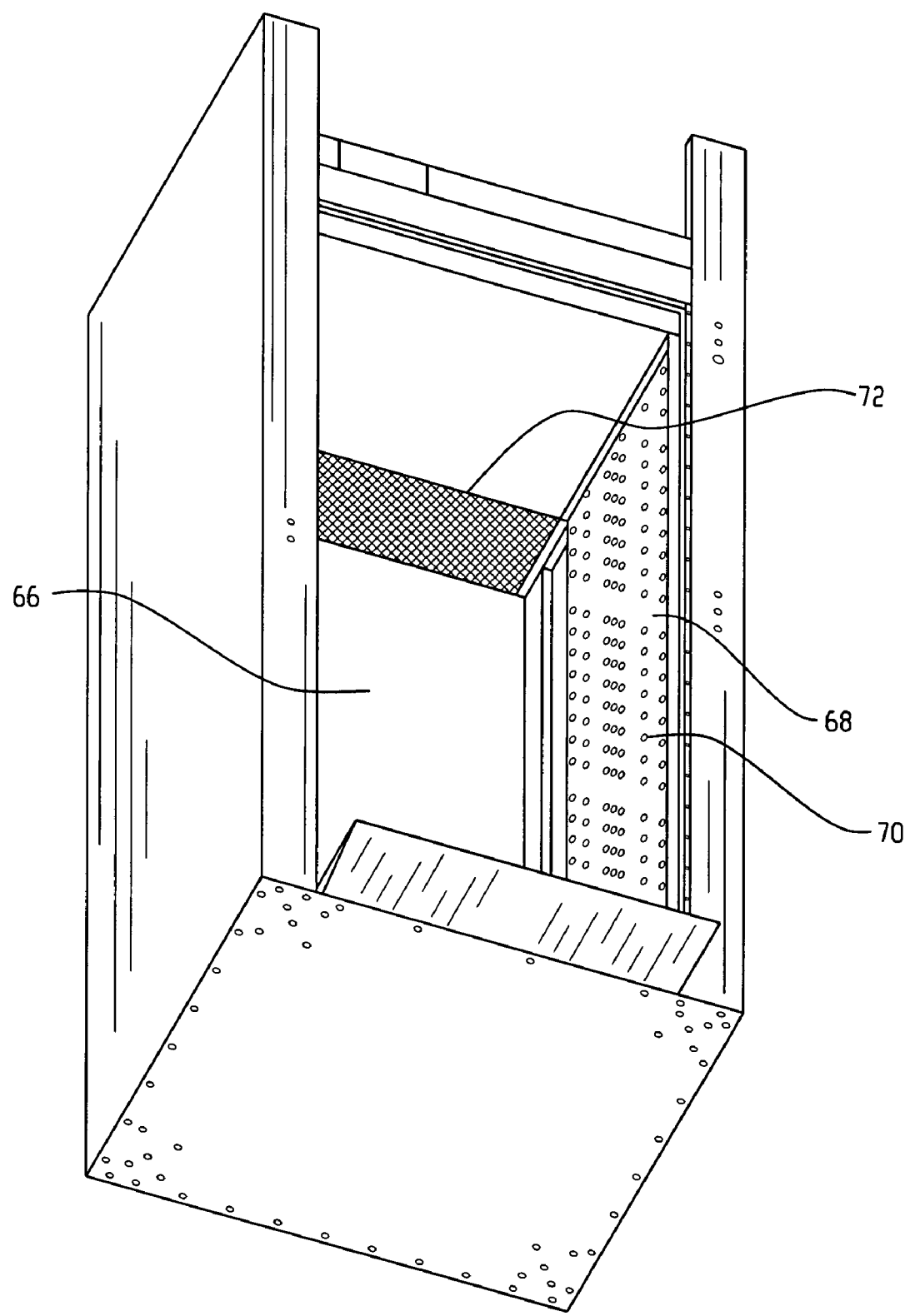
Figure 7:
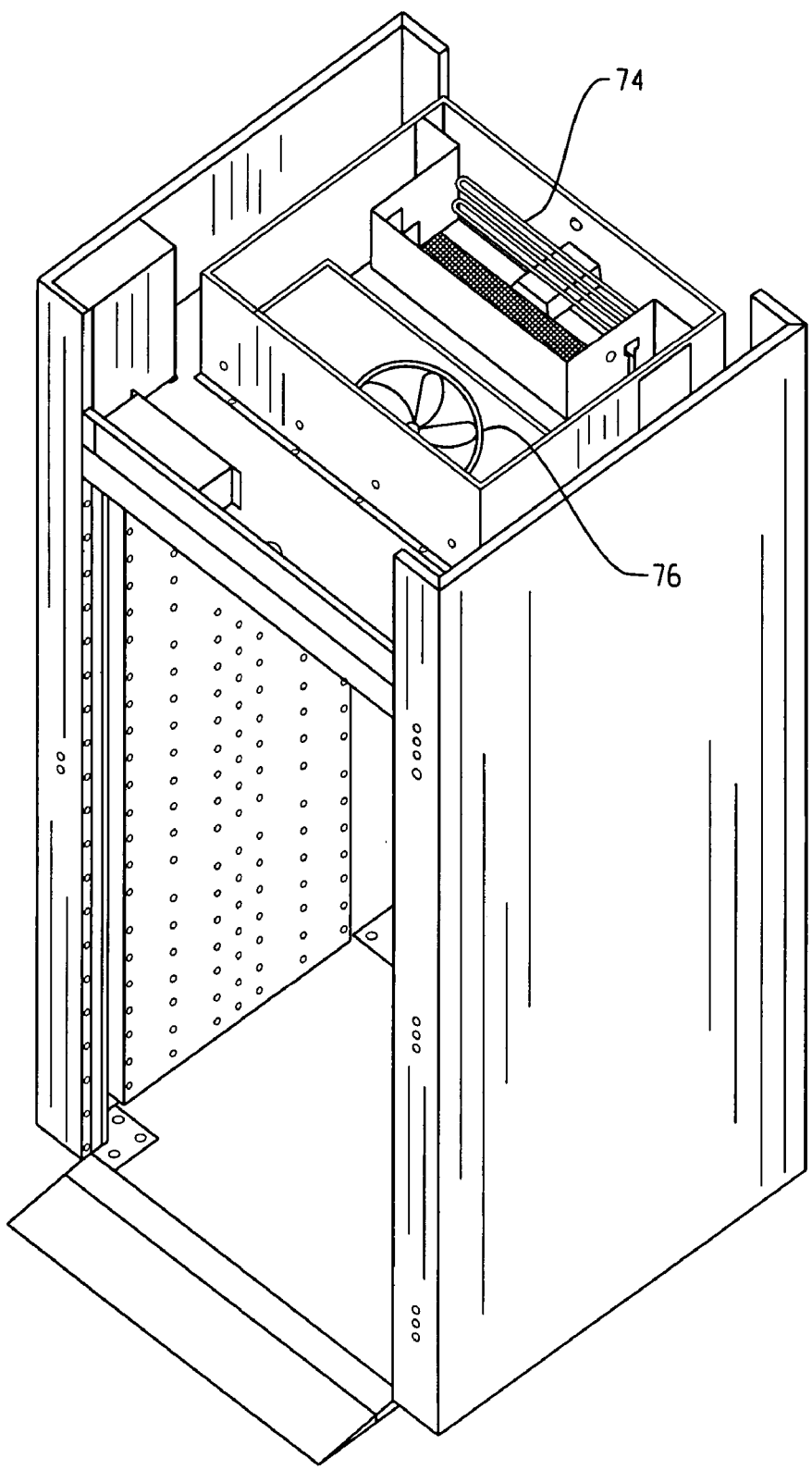
Figure 8B:
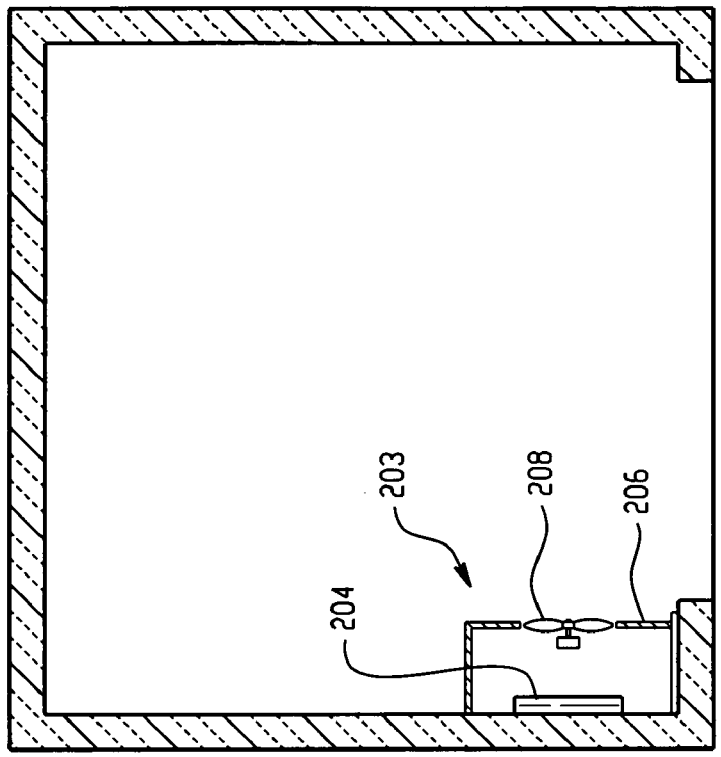
FIGS. 8A-8B show a known, prior art dough proofer.
Figure 8A:
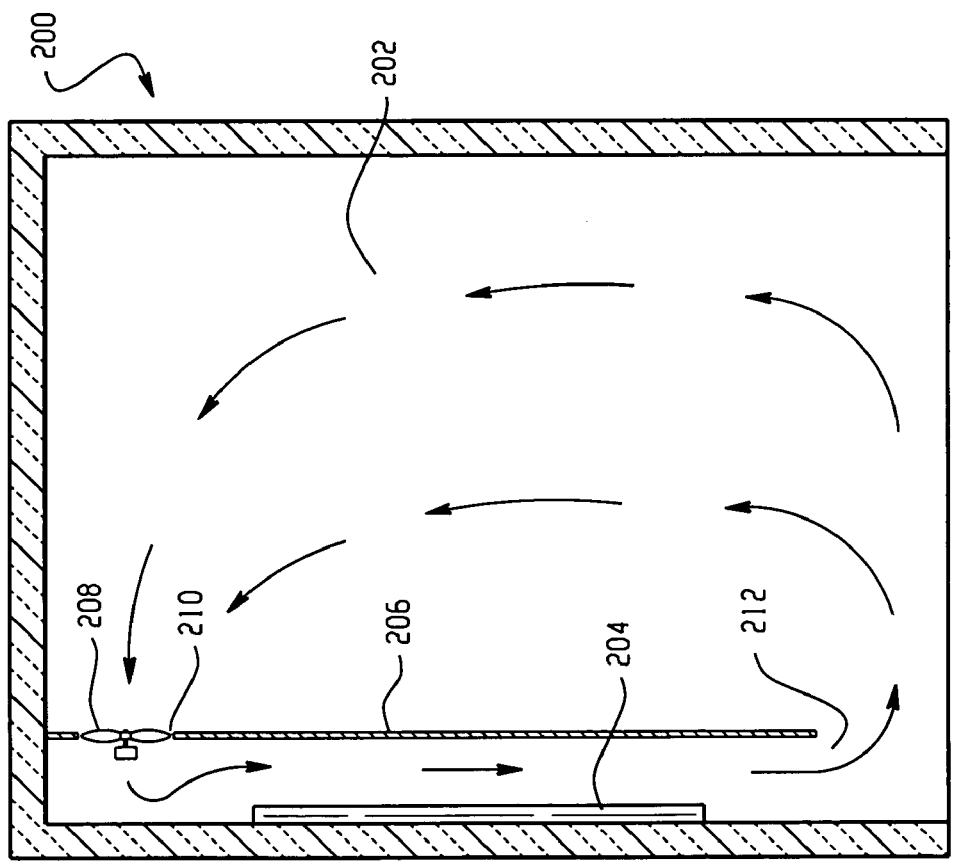
Figure 9A:
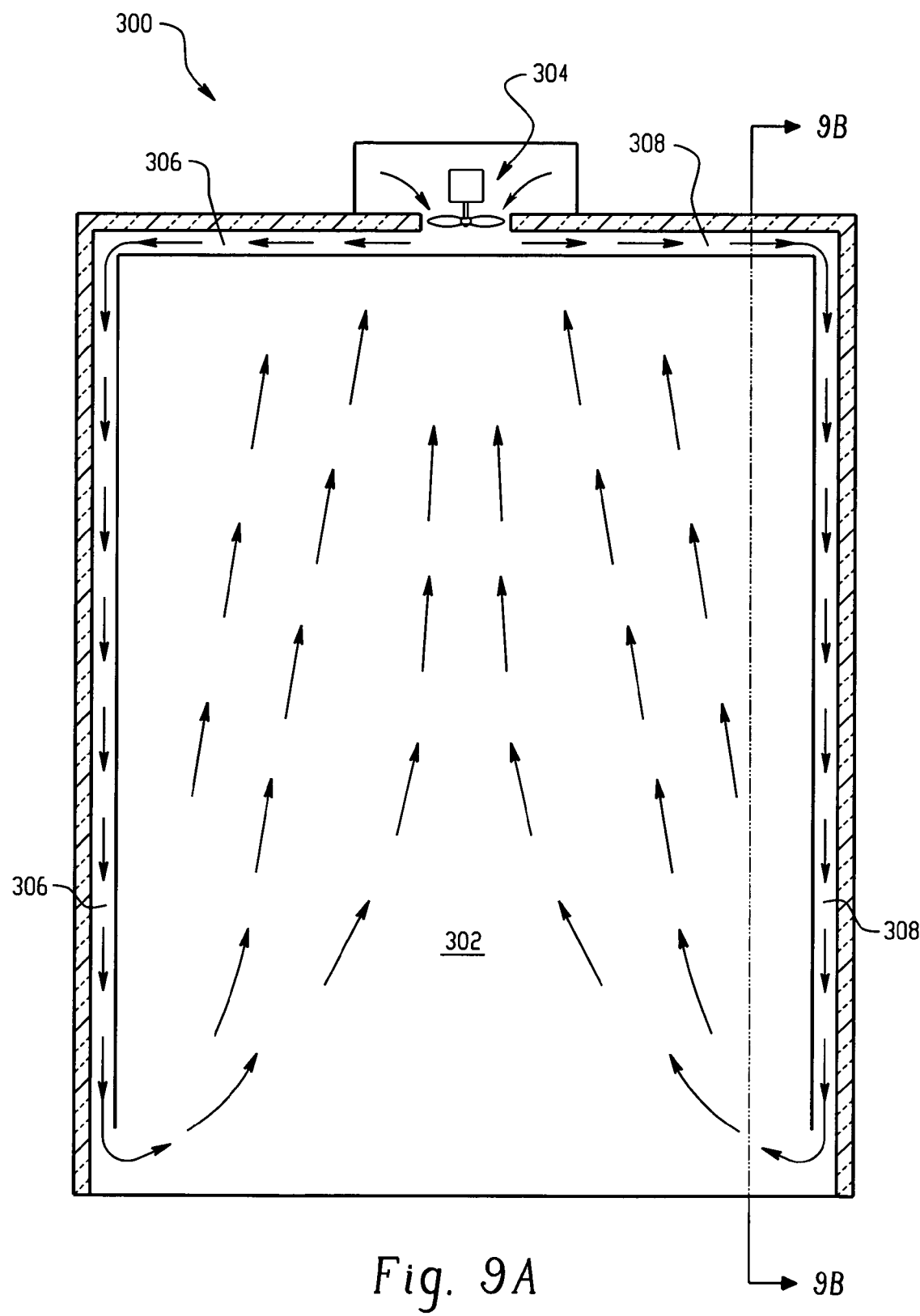
FIGS. 9A and 9B show another known, prior art dough proofer.
Figure 9B:
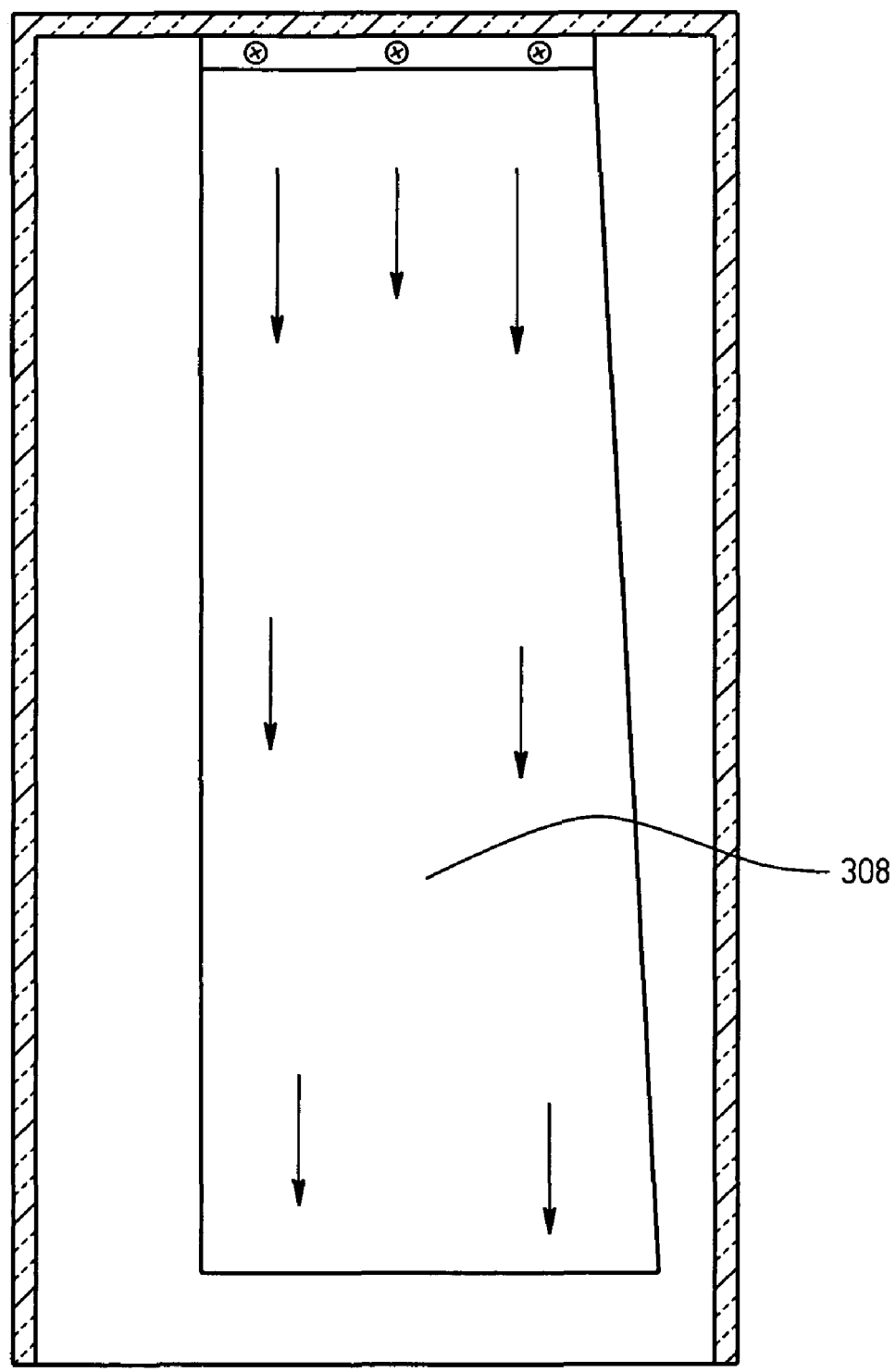

Another embodiment of a proofer 60 is shown in FIGS. 5-7, and is similar in construction to proofer 10, with the primary difference being that the chamber 62 of proofer 60 is sized as a single compartment unit for containing only a single rack. Side air ducts are formed behind side panels 64 and 68 and define distributed air duct openings 70. An outlet opening 72 at the top of the chamber 62 leads to a heating element 74 then past blower 76, which pushes air back into the side ducts. The air flow of the unit is generally as described with reference to proofer 10.

In one example the blowers 34 and 76 of the proofers are sized and operated to produce an air flow of between 250 ft$^3$/min and 400 ft$^3$/min. The chamber volume for proofer 10 is between 60 ft$^3$ and 90 ft$^3$ and the chamber volume for proofer 60 is between 30 ft$^3$ and 45 ft$^3$. Variations from these numbers are possible and contemplated.

It is to be clearly understood that the above description is intended by way of illustration and example only and is not intended to be taken by way of limitation. For example, while the illustrated embodiments do not contain any humidity controls, a source of water could be provided for such purpose, along with a humidity sensor. As another example, while the illustrated embodiment describes a heating element in the nature of an energizable, resistive heating element, in other embodiments non-electric heating elements could be used, such as a combustion type heat exchanger. Further, while the illustrated embodiments provide the blower downstream of the chamber air outlet opening and heating element, the blower or blowers could be located at other locations in the air flow path, including upstream of the heating element. In still another example, where the side air ducts are not pressurized by the flow caused by the blower or blowers, additional ductwork or baffling could be provided to be sure that some of the air flow is diverted toward the lower end of the panels. Other changes and modifications could be made, including both narrowing and broadening variations of the previously described embodiments.

What is claimed is:

1. A dough proofing apparatus having an improved air flow arrangement, comprising:

a chamber for holding dough during proofing operations and having a door for accessing the chamber, an air duct extending on a first side of the chamber and having a plurality of openings distributed both vertically and horizontally in the chamber, an air duct extending on a second side of the chamber and having a plurality of openings distributed both vertically and horizontally in the chamber, the second side opposite the first side;

an opening in the chamber for receiving air from within the chamber;

a heating element for heating air received through the upper opening wherein the heating element is located outside the chamber;

a collection/distribution area for collection and uniform distribution of air heated by the heating element, the collection/distribution area being in a location downstream and separate from the heating element and in substantially the same horizontal plane as the heating element;

a blower for causing air to flow from the chamber through the upper opening for heating, over the heating element, and to the collection/distribution area, a first air flow path leading from the collection/distribution area to the air duct on the first side of the chamber;

a second air flow path leading from the collection/distribution area to the air duct on the second side of the chamber;

wherein heated air is distributed uniformly through each of the first and second air flow paths leading to each of the air duct on the first side of the chamber and the air duct on the second side of the chamber, respectively.

2. The apparatus of claim 1, wherein the blower is sized to move air at a rate sufficient to pressurize both the air duct on the first side of the chamber and the air duct on the second side of the chamber to thereby increase uniformity of air flow through the air duct openings.

3. The apparatus of claim 1, wherein the air duct openings on the first side of the chamber are vertically distributed over at least two thirds (⅔) of a height of the chamber, and wherein the air duct openings on the second side of the chamber are vertically distributed over at least two thirds (⅔) of the height of the chamber.

4. The apparatus of claim 1, wherein the air duct openings on the first side of the chamber are vertically distributed over at least three fourths (¾) of a height of the chamber, and wherein the air duct openings on the second side of the chamber are vertically distributed over at least three fourths (¾) of the height of the chamber.

5. The apparatus of claim 1, wherein the air duct openings on the first side of the chamber are vertically distributed over at least four fifths (⅘) of a height of the chamber, and wherein the air duct openings on the second side of the chamber are vertically distributed over at least four fifths (⅘) of the height of the chamber.

6. The apparatus of claim 1, further comprising a controller connected to control the blower and the heating element during proofing operations to provide a temperature condition within the chamber suitable for proofing dough.

7. The apparatus of claim 6, further comprising a temperature sensor connected to provide input to the controller.

8. The apparatus of claim 6, wherein the temperature condition is a temperature in the range of 65° F. to 115° F.

9. The apparatus of claim 8, wherein the temperature condition is a temperature in the range of about 90° F. to about 100° F.

10. The apparatus of claim 1, wherein the first air flow path and the second air flow path overlap in a region immediately downstream of the blower.

11. The apparatus of claim 1, wherein the upper opening is located in a ceiling of the chamber.

12. The apparatus of claim 1, wherein the air duct on the first side of the chamber extends downward from a top of the chamber toward a bottom of the chamber, and the air duct on the second side of the chamber extends downward from the top of the chamber toward the bottom of the chamber.

13. A method for proofing dough, comprising:
providing a dough proofing apparatus having a chamber for holding dough, air ducts located on opposing sides of the chamber with a plurality of openings therein, the air duct openings arranged so as to be distributed both vertically and horizontally in the chamber, an upper opening in the chamber for receiving air from within the chamber, a heating element for heating air received through the upper opening wherein the heating element is located outside the chamber, a collection/distribution area for collecting and uniform distribution of air heated by the heating element the location of the collection/distribution area being in substantially the same horizontal plane as the heating element, a blower for causing air to flow from the chamber through the upper opening for heating, over the heating element, and to the collection/distribution area, a first and second air flow path leading from the collection/distribution area to the air ducts located on opposing sides of the chamber, respectively, wherein heated air is distributed uniformly through each of the first and second air flow paths leading to each of the respective air ducts,
placing dough within the chamber;
operating the blower outside the chamber to cause air flow from the chamber, through the upper opening over the heating element, to the collection/distribution area, and along each of the first and second air flow paths and out through the air duct openings; and
controlling a heat output by the heating element to produce a temperature condition within the chamber suitable for proofing dough.

14. The method of claim 13, wherein the temperature condition is a temperature in the range of 65° F. to 115° F.

15. The method of claim 13, wherein the temperature condition is a temperature in the range of 90° F. to 100° F.

16. The method of claim 13, wherein operation of the blower creates a pressurized condition in the air duct.

\* \* \* \* \*